US009299340B2

(12) United States Patent
Kar et al.

(10) Patent No.: US 9,299,340 B2
(45) Date of Patent: Mar. 29, 2016

(54) SYSTEM AND METHOD FOR CORRECTING ACCENT INDUCED SPEECH IN AN AIRCRAFT COCKPIT UTILIZING A DYNAMIC SPEECH DATABASE

(71) Applicant: HONEYWELL INTERNATIONAL INC., Morristown, NJ (US)

(72) Inventors: Satyanarayan Kar, Bangalore (IN); Kiran Gopala Krishna, Bangalore (IN); Jitender Kumar Agarwal, Muzaffarnagar (IN); Robert E. De Mers, Nowthen, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 241 days.

(21) Appl. No.: 14/047,518

(22) Filed: Oct. 7, 2013

(65) Prior Publication Data
US 2015/0100311 A1 Apr. 9, 2015

(51) Int. Cl.
*G10L 15/00* (2013.01)
*G10L 15/07* (2013.01)
(Continued)

(52) U.S. Cl.
CPC .............. *G10L 15/07* (2013.01); *G08G 5/0013* (2013.01); *G10L 15/22* (2013.01); *G08G 5/0021* (2013.01)

(58) Field of Classification Search
CPC ....... G10L 15/00; G10L 15/005; G10L 15/01; G10L 15/065; G10L 15/07; G10L 15/08; G10L 15/18; G10L 15/1807; G10L 15/1815; G10L 15/1822; G10L 15/183; G10L 15/20; G10L 15/24; G10L 2015/00; G10L 2015/002; G10L 2015/06; G10L 2015/08; G10L 2015/225; G10L 2015/228

USPC ......... 704/231, 235, 251, 236, 246, 250, 255, 704/270, 270.1
See application file for complete search history.

(56) References Cited

U.S. PATENT DOCUMENTS 5,200,901 A * 4/1993 Gerstenfeld et al. .......... 701/120
5,659,475 A * 8/1997 Brown .......................... 701/120
(Continued)

FOREIGN PATENT DOCUMENTS

EP 2608188 A1 6/2013
WO 2011149837 A1 12/2011

OTHER PUBLICATIONS

Bouselmi, G. et al.: "Combined Acoustic and Pronunciation Modelling for Non-Native Speech Recognition" URL: http://arxiv.org/pdf/0711.0811.pdf.
(Continued)

*Primary Examiner* — Qi Han
(74) *Attorney, Agent, or Firm* — Ingrassia Fisher & Lorenz, P.C.

(57) ABSTRACT

A system and method for recognizing speech on board an aircraft that compensates for different regional dialects over an area comprised of at least first and second distinct geographical regions, comprises analyzing speech in the first distinct geographical region using speech data characteristics representative of speech in the first distinct geographical region, detecting a change in position from the first distinct geographical region to the second geographical region, and analyzing speech in the second distinct geographical region using speech data characteristics representative of speech in the second distinct geographical region upon detecting that the aircraft has transitioned from the first distinct geographical region to the second distinct geographical region.

18 Claims, 2 Drawing Sheets

(51) Int. Cl.
*G08G 5/00* (2006.01)
*G10L 15/22* (2006.01)

(56) References Cited

U.S. PATENT DOCUMENTS

| | | |
|---|---|---|
| 8,112,276 B2 | 2/2012 | Sumiyoshi et al. |
| 8,417,526 B2 | 4/2013 | Bourdon |
| 2003/0191639 A1 | 10/2003 | Mazza |
| 2005/0080632 A1 | 4/2005 | Endo et al. |
| 2008/0039988 A1* | 2/2008 | Estabrook et al. ............ 701/14 |
| 2009/0018840 A1 | 1/2009 | Lutz et al. |
| 2009/0150013 A1* | 6/2009 | Finn et al. .................. 701/11 |
| 2011/0282522 A1 | 11/2011 | Prus et al. |
| 2012/0010887 A1* | 1/2012 | Boregowda et al. ......... 704/250 |
| 2012/0022869 A1 | 1/2012 | Lloyd et al. |

OTHER PUBLICATIONS

Hofbauer, K.: "Speech Watermarking and Air Traffic Control" Doctoral Thesis, Faculty of Electrical and Information Engineering, Graz University of Technology, Austria, Graz, Mar. 6, 2009; URL: http://www.eurocontrol.int/eec/gallery/content/public/documents/PhD_theses/2009/Ph.D_Thesis_2009_Hofbauer_K.pdf.

Ragnarsdottir, M.D., et al.; Using Language Technology to Increase Efficiency and Safety in ATC Communication; Journal of Aerospace Computing, Information, and Communication; vol. 3, Dec. 2006.

Lechner, A., et al.; Voice Recognition: Software Solutions in Real-Time ATC Workstations; IEEE AESS Systems Magazine, Nov. 2002.

Geacar, C., et al.; Language Modeling in Air Traffic Control; U.P.B. Sci. Bull., Series D. vol. 74, Issue 4, 2012.

EP extended search report for EP 14185041.2-1901 dated Feb. 13, 2015.

* cited by examiner

SYSTEM AND METHOD FOR CORRECTING ACCENT INDUCED SPEECH IN AN AIRCRAFT COCKPIT UTILIZING A DYNAMIC SPEECH DATABASE

FIELD OF THE INVENTION

Embodiments disclosed herein relate generally to the processing of verbal communications and, more particularly, to a speech transmission system for reducing accent-induced anomalies in air-to-ground, ground-to-air, and air-to-air communications.

BACKGROUND

It is well known that human speech is being increasingly used as input data to electronically conduct transactions, send and receive information, and provide command and control. With the above in mind, it is also known that the airline and avionics industries operate in a global environment where oftentimes parties must communicate verbally in a language that is not their primary or native language. The accuracy of the communication depends on how well each of the speakers articulates each of the words he or she has spoken, which may depend on whether, and to what extent, he or she speaks with an accent. If the speaker's accent is severe, communications between, for example, neighboring aircraft, air traffic control (ATC), and landing or departing aircraft, etc. may be problematic. In fact, roughly sixty-five percent of pilots who fly internationally report difficulties communicating with ATC due to the air traffic controller's accent when speaking English.

This problem is ubiquitous among controllers in many countries, notwithstanding that seventy-five percent of communicators use ICAO (International Civil Aviation Organization) standard phraseology. Thus, translation is not the problem. Rather, the problems are associated with accent, pitch, pronunciation, and bitrate. Such communication problems impair a pilot's ability to understand and follow instructions, requiring significantly more effort and concentration.

Speech recognition is always specific to the language of the speaker, and the pronunciation of the speaker's language is not standardized from one region to another, even across nations. For example, North American English can be separated into several regional dialects based on phonological, lexical, and certain syntactic features. That is, North American English includes American English, which itself includes several regional varieties. Thus, a pilot on a long flight over different regions may interact with air traffic controllers that speak with accents based on the specific region's phonetic and lexical variations, thus adding to the pilot's workload.

In view of the foregoing, it would be desirable to provide an adaptive speech interface that automatically compensates for regional dialects during communications with aircraft in the region over which the aircraft is flying. It would also be desirable to provide an adaptive speech interface that utilizes an acoustic model tailored to the distinct geographical region over which the aircraft is flying.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In accordance with an embodiment, there is provided a method for recognizing speech onboard an aircraft that compensates for different regional dialects over an area comprised of at least first and second distinct geographical regions. The method comprises analyzing speech in the first distinct geographical region using speech data characteristics representative of speech in the first distinct geographical region, detecting a change in position from the first distinct geographical region to the second geographical region, and analyzing speech in the second distinct geographical region using speech data characteristics representative of speech in the second distinct geographical region upon detecting that the aircraft has transitioned from the first distinct geographical region to the second distinct geographical region.

There is also provided a flight deck system for recognizing speech on board an aircraft that compensates for different regional dialects over an area comprised of at least first and second distinct geographical regions. The system comprises a first source of speech data that represents a first speech database that is characteristic of speech in the first distinct geographical region, and a second source of speech data that represents a second speech database that is characteristic of speech in the second distinct geographical region. A processor is coupled to the first source and to the second source and is configured to process speech in the first distinct geographical region utilizing data in the first source, switch to the second source when the aircraft enters the second distinct geographical region, and process speech in the second distinct geographical region utilizing data in the second source.

Also provided is an avionics speech recognition method that compensates for regional dialects over an area comprised of at least an initial aircraft position in a first distinct geographical region and at least second and third distinct geographical regions. The method comprises initializing a speech recognition system with current aircraft position data and speech data representative of speech characteristics in the initial distinct aircraft position and at least first and second additional distinct geographical regions, and processing speech in the initial distinct geographical region utilizing speech data associated with the initial distinct geographical region, in the second distinct geographical region when the aircraft transitions from the initial distinct geographical region to the second distinct geographical region utilizing speech data associated with the second distinct geographical region, and in the third geographical region when the aircraft transitions from the second distinct geographical region to the third distinct geographical region utilizing speech data associated with the third distinct geographical region.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figures 1, 2:
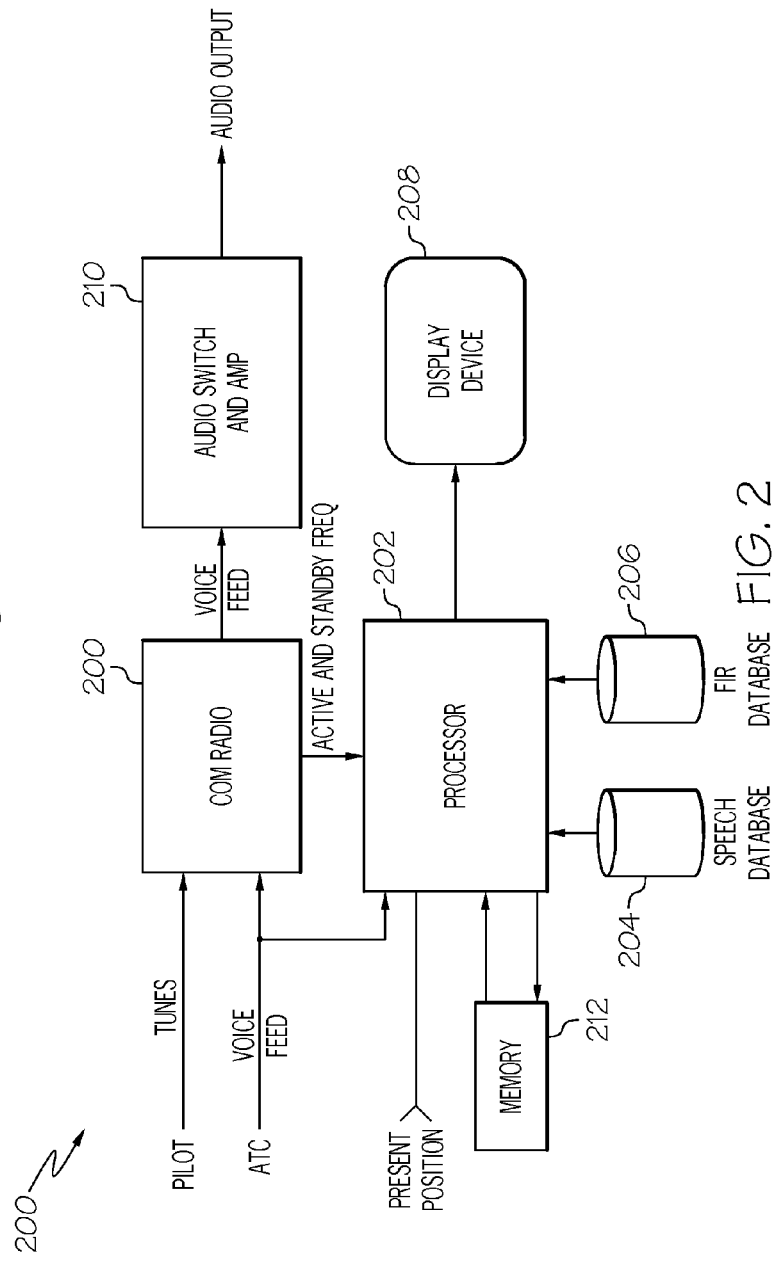
FIG. 1 is a table representative of an acoustic map structure in accordance with an exemplary embodiment.
FIG. 2 is a block diagram of an adaptive speech interface that automatically compensates for regional dialects in accordance with an exemplary embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As stated previously, North American English comprises several regional dialects based on, for example, phonological awareness (the ability to identify and manipulate units of oral language such as words and syllables); lexical awareness (of or pertaining to the words or vocabulary of a language as distinguished from its grammatical and syntactic aspects); and syntactic awareness (the rules for the formation of grammatical sentences and phrases in a language).

In aviation, a flight information region (FIR) is a specified region of airspace in which a flight information service and an alerting service (ALRS) are provided. It is the largest regular division of airspace in use in the world today. Every portion of the atmosphere belongs to a specific FIR. While smaller countries' airspace may be encompassed by a single FIR, larger countries' airspace is subdivided into a number of regional FIRs. Some FIRs encompass the territorial airspace of several countries. Oceanic airspace is divided into Oceanic Information Regions and delegated to a controlling authority bordering that region. The division among authorities is done by international agreement through the International Civil Aviation Organization (ICAO). An area control center (ACC) is a facility responsible for controlling aircraft en route in a particular volume of airspace (a FIR) at high altitude between airport approaches and departures. As such, an ACC may also be referred to as an Air Route Traffic Control Center. An ACC typically accepts traffic from, and ultimately passes traffic to, to control by a Terminal Control Center or another ACC. The transfer of traffic is executed by voice communication ATC and pilots. The geographic definition of each FIR region is stored in an FIR database (206 in FIG. 2).

An acoustic model is created by making audio recordings of speech and its textual transitions using software to create statistical representations of the sounds that make up each word. A phonetic dictionary that permits words to be located by the "way they sound"; i.e. a dictionary that matches common or phonetic misspellings with the correct spelling of each word. Such a dictionary uses pronunciation respelling to aid in the search for or recognition of a word.

For every region, only certain acoustic models and their associated phonetic dictionaries will deliver high speech recognition accuracies. Thus, a speech database as used herein shall include an acoustic model, a phonetic dictionary, and a language model, which comprises the statistical representation of all the words that can be spoken by an FIR/ATC controller that comply with FIR/ATC phraseology.

Embodiments described herein contemplate the use of an adaptive speech interface that automatically changes the speech database depending on the FIR region over which the aircraft is flying. The speech database is generated for each FIR based on the composition of personnel manning the FIR region. Periodically, the speech database is updated based on a change in this composition. This mapping of the speech database to the flight information region is referred to herein as an FIR Acoustic Map or an FIR Acoustic Relationship Database. A comprehensive Speech Database is comprised of the FIR Acoustic Map for the entire world. Thus, the Speech Database (204 in FIG. 2) is comprised of an acoustic model, phonetic dictionary, and language model for all FIR regions, and the FIR Acoustic Map relates an FIR region to a speech database comprised of an acoustic model, phonetic dictionary, and language model.

The embodiments described herein further contemplate that the Speech Database 204 is made available as a loadable component in the cockpit much in the same way as are charts, navigation databases, and the like. Revisions of the Speech Database 204 may be issued to improve accuracy. It is also contemplated that the Speech Database 204 may be made available on a subscription basis covering the entire world or portions thereof; e.g. geographic locations served by a specific airline, charter, or even in conjunction with personal aircraft. As the aircraft transitions from one FIR region to another, a processor 202 (described in connection with FIG. 2) hosted in the aircraft switches the reference to the acoustic model, phonetic dictionary, and language model in the speech database in accordance with the rules defined in the FIR Acoustic Map and automatically adapts the speech attributes to the speech database for the new FIR region. The acoustic map changeover may be initiated by an ATC command that instructs a pilot to (1) tune the radio to listen to a newly assigned ATC controller; e.g. "N1234 CONTACT ALEXANDER CONTROL 129.1", (2) tune the radio to the standby frequency; e.g. "N1234 STANDBY FOR STEPHENVILLE TOWER 118 . . . 8"; or (3) listen to an ATIS (Automatic Terminal Information Service) broadcast: e.g. "N1234 MONITOR ATIS 123.250". Alternatively, when the aircraft enters a new FIR region, the speech engine automatically adapts and loads or references the acoustic model, phonetic dictionary, and language model (i.e. the speech database) in the speech database for the new FIR region. When ATC speaks to a pilot, the airborne voice engine decodes the ATC voice commands and outputs the audio and text to the pilot. In this manner, the generated text can be stored and recalled at a later time, thus reducing the pilot's workload.

Referring to FIG. 1, there is shown a table 100 that illustrates an FIR Acoustic Map structure comprised of n rows (only two of which are shown for clarity) and six columns representing, respectively, FIR region 102 and the associated unique COM Frequency 104, Acoustic Model Reference 106, Phonetic Dictionary Reference 108, Language Model Reference 110, and Confidence Level 112. The first row is populated by FIR region FIRID1, unique COM Frequency XXX, Acoustic Model Reference AM_X1, Phonetic Dictionary Reference PD_X1, Language Model Reference LM_X1, and Confidence Level 92%. The last row is populated by FIR region FIRID1n, unique COM Frequency YYY, Acoustic Model Reference AM_Xn, Phonetic Dictionary Reference PD_Xn, Language Model Reference LM_Xn, and Confidence Level 93%.

For each of the included FIR regions, a trainer system listens to ATC voice samples (live or recorded) for each of the FIR regions and creates a corpus. This is converted to an acoustic model for each of the FIR regions. An acoustic map of the type shown in FIG. 1 is then created. These steps are repeated until a desired confidence level is attained.

FIG. 2 is a block diagram of an avionics communication system that illustrates a speech engine including an adaptive voice recognition system that automatically alters an acoustic model, phonetic dictionary, and language model based on the region in which the aircraft is located. As can be seen, a communication (COM) radio 200 receives and is responsive to pilot tuning of active and standby communication frequencies via a first input thereof and to a voice feed from ATC at a second input thereof. The ATC voice feed is also provided to a first input of a processor 202 that performs an adaptive voice recognition process on the received voice. Processor 202 also receives position data at a second input thereof and frequency information (active/standby frequency) at a third input thereof from radio 200. The above described Speech Database 204 and FIR database 206 are coupled to fourth and fifth inputs, respectively, of processor 202. The output of processor 202 is coupled to a cockpit display device 208, which displays the ATC voice command as text. The voice feed from radio 200 is provided to an input of audio switch and amplifier 210, which in turn provides an audio output.

The processor 202 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The memory 212 may be realized as RAM memory, flash memory, EPROM memory, EEPROM memory, registers, a hard disk, a removable disk, a CD-ROM, or any other form of storage medium known in the art. In this regard, the memory 212 can be coupled to the processor 202 such that the processor 202 can read information from, and write information to, the memory 212. In the alternative, the memory 212 may be integral to the processor 202. As an example, the processor 202 and the memory 212 may reside in an ASIC. In practice, a functional or logical module/component of the system might be realized using program code that is maintained in the memory 212. For example, the components of the system may have associated software program components that are stored in the memory 212.

Figure 3:
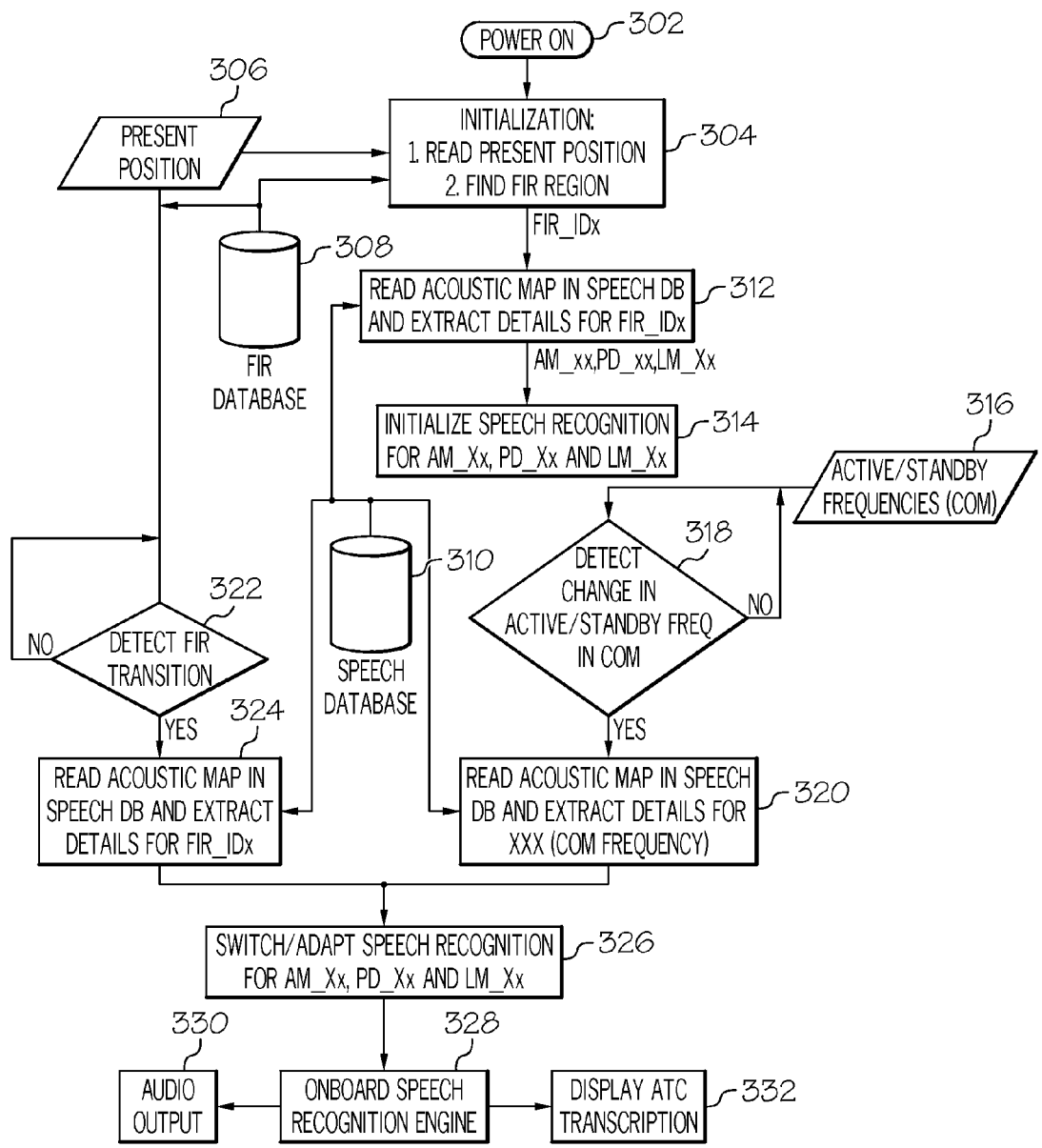
FIG. 3 is a flow chart illustrating an exemplary embodiment of a method suitable for use in a flight deck communication and display system for recognizing speech by altering the speech recognition acoustic model in accordance with the geographic region over which the aircraft is flying.

In an exemplary embodiment, the display device 206 is realized as an electronic display configured to graphically display flight information or other data associated with operation of the host aircraft. In practice, the processor 202 produces image rendering display commands that are received by the display device 206 for purposes of rendering the display. The display device 206 is usually located within a cockpit of the host aircraft. It will be appreciated that although FIG. 2 shows a single display device 206, in practice, additional display devices may be present onboard the host aircraft. FIG. 3 is a flow chart that illustrates an exemplary embodiment of a process 300 suitable for use with a flight deck display and communication system shown in FIG. 2. Process 300 represents one implementation of a method for recognizing speech by altering the acoustic model, upon which the speech recognition is based, in accordance with the specific geographical region in which an aircraft is currently located. The various tasks performed in connection with process 300 may be performed by software, hardware, firmware, or any combination thereof. For illustrative purposes, the following description of process 300 may refer to elements mentioned above in connection with FIG. 3. In practice, portions of process 300 may be performed by different elements of the described system, e.g., a processor, a display device, or a data communication component. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

Referring now to FIG. 3, after power is applied (STEP 302), the adaptive voice recognition system is initialized (STEP 304). This includes receiving present position data (306) and present FIR data (308). The acoustic map in the Speech Database (310) is initialized to the present position of the aircraft (i.e. the current FIR region) (STEP 312), and the system is initialized to the acoustic model, phonetic dictionary, and the language model (i.e. the database) for the initial position (STEP 314).

Two situations may cause the acoustic map to determine a new speech database. First, the active/standby communication frequency (316) is monitored to determine if there has been a frequency change (STEP 318). If a change has occurred, the acoustic map is referenced to adapt to a new speech database (STEP 320) in Speech Database 310. Second, in STEP 322, the position of the aircraft (306) is monitored, and an FIR transition is detected. In this case, the acoustic map if referenced to adapt to extract the details associated with the new FIR region (STEP 324). In either case, the new parameters are retrieved (STEP 326), and speech recognition is conducted using the new parameters (STEP 328). The speech may then be provided to an audio output (STEP 330) and/or displayed (STEP 332).

Thus, there has been provided a system and method for suitable for use in conjunction with a flight deck display system wherein speech is recognized by altering the acoustic model, upon which the speech recognition is based, in accordance with the specific geographical region in which an aircraft is currently located.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method, executable by a processor, for recognizing speech in a speech recognition system on board an aircraft that compensates for different regional dialects over an area comprised of at least first and second distinct geographical regions, the method comprising:
    analyzing speech in the first distinct geographical region using speech data characteristics representative of speech in the first distinct geographical region, wherein analyzing the speech data characteristics comprises referencing at least one of an acoustic model, a phonetic dictionary, and a language model in the speech recognition system on board of the aircraft;
    detecting a change in position from the first distinct geographical region to the second geographical region; and
    analyzing speech in the second distinct geographical region using speech data characteristics representative of speech in the second distinct geographical region upon detecting that the aircraft has transitioned from the first distinct geographical region to the second distinct geographical region.

2. The method of claim 1 wherein the first distinct geographic region corresponds to an initial position of the aircraft.

3. The method of claim 1 further comprising:
    listening to air traffic control samples;
    constructing a speech database for each distinct geographic region; and
    selecting a speech database that provides the greatest accuracy.

4. The method of claim 3 wherein the speech database is selected for a flight information region (FIR) corresponding to one of an active communication frequency and a standby communication frequency.

5. The method of claim 4 further comprising loading a new speech database when the aircraft enters a new distinct geographic region.

6. A method, executable by a processor, for recognizing speech in a speech recognition system on board an aircraft that compensates for different regional dialects over an area comprised of at least first and second distinct geographical regions, the method comprising:
    analyzing speech in the first distinct geographical region using speech data characteristics representative of speech in the first distinct geographical region;
    detecting a change in position from the first distinct geographical region to the second geographical region; and
    analyzing speech in the second distinct geographical region using speech data
    characteristics representative of speech in the second distinct geographical region upon detecting that the aircraft has transitioned from the first distinct geographical region to the second distinct geographical region;
    wherein each distinct geographical region is characterized by a unique aircraft communication frequency, and further comprising:
    monitoring the aircraft communication frequency;
    detecting a new communication frequency when the aircraft transitions from the first distinct geographical region to the second distinct geographical region; and
    analyzing speech in the second distinct geographical region using the speech data characteristics representative of speech in the second distinct geographical region.

7. A method, executable by a processor, for recognizing speech in a speech recognition system on board an aircraft that compensates for different regional dialects over an area comprised of at least first and second distinct geographical regions, the method comprising:
    analyzing speech in the first distinct geographical region using speech data characteristics representative of speech in the first distinct geographical region;
    detecting a change in position from the first distinct geographical region to the second geographical region; and
    analyzing speech in the second distinct geographical region using speech data
    characteristics representative of speech in the second distinct geographical region upon detecting that the aircraft has transitioned from the first distinct geographical region to the second distinct geographical region;
    wherein each distinct geographical region is characterized by a unique aircraft communication frequency, and further comprising:
    monitoring the aircraft communication frequency, wherein the aircraft communication frequency is one of an active frequency and a standby frequency;
    detecting a new communication frequency when the aircraft transitions from the first distinct geographical region to the second distinct geographical region; and
    analyzing speech in the second distinct geographical region using the speech data characteristics representative of speech in the second distinct geographical region.

8. A method, executable by a processor, for recognizing speech in a speech recognition system on board an aircraft that compensates for different regional dialects over an area comprised of at least first and second distinct geographical regions, the method comprising:
    analyzing speech in the first distinct geographical region using speech data characteristics representative of speech in the first distinct geographical region;
    detecting a change in position from the first distinct geographical region to the second geographical region; and
    analyzing speech in the second distinct geographical region using speech data
    characteristics representative of speech in the second distinct geographical region upon detecting that the aircraft has transitioned from the first distinct geographical region to the second distinct geographical region;

wherein each distinct geographical region is characterized by a unique aircraft communication frequency, and further comprising:
monitoring the aircraft communication frequency, wherein the aircraft communication frequency is one of an active frequency and a standby frequency;
monitoring a voice feed from air traffic control;
detecting a new communication frequency when the aircraft transitions from the first distinct geographical region to the second distinct geographical region; and
analyzing speech in the second distinct geographical region using the speech data characteristics representative of speech in the second distinct geographical region.

9. A method, executable by a processor, for recognizing speech in a speech recognition system on board an aircraft that compensates for different regional dialects over an area comprised of at least first and second distinct geographical regions, the method comprising:
analyzing speech in the first distinct geographical region using speech data characteristics representative of speech in the first distinct geographical region;
detecting a change in position from the first distinct geographical region to the second geographical region; and
analyzing speech in the second distinct geographical region using speech data characteristics representative of speech in the second distinct geographical region upon detecting that the aircraft has transitioned from the first distinct geographical region to the second distinct geographical region;
wherein each distinct geographical region is characterized by a unique aircraft communication frequency, and further comprising:
monitoring the aircraft communication frequency, wherein the aircraft communication frequency is one of an active frequency and a standby frequency;
monitoring a voice feed from air traffic control;
detecting a new communication frequency when the aircraft transitions from the first distinct geographical region to the second distinct geographical region;
analyzing speech in the second distinct geographical region using the speech data characteristics representative of speech in the second distinct geographical region; and displaying air traffic control text on a cockpit display.

10. The method of claim 9 wherein a selected speech database for a region is the one with the greatest accuracy for that region.

11. The method of claim 10 further comprising initializing the speech recognition system with initial position data and an initial flight information region (FIR).

12. An aircraft speech recognition system that compensates for regional dialects over an area comprised of at least first and second distinct geographical regions, comprising:
a first source of speech data that represents a first acoustic model, a first phonetic dictionary, and a first language model in the aircraft speech recognition system that is characteristic of speech in the first distinct geographical region;
a second source of speech data that represents a second acoustic model, a second phonetic dictionary, and a second language model in the aircraft speech recognition system that is characteristic of speech in the second distinct geographical region; and
a processor coupled to the first source and to the second source and configured to process speech in the first distinct geographical region utilizing data in the first source, switch to the second source when the aircraft enters the second distinct geographical region, and process speech in the second distinct geographical region utilizing data in the second source.

13. The system of claim 12 wherein the first data source comprises a speech database and a flight information region (FIR) database associated with each geographic region, an wherein the speech database for each geographic region comprises an acoustic model optimized for each FIR region.

14. The system of claim 13 wherein the processor is coupled to the FIR database, the speech database, a third source of aircraft position data, and a fourth source of aircraft communication frequency data.

15. The system of claim 14 wherein the fourth source comprises active and standby frequency data.

16. The system of claim 15 further comprising a cockpit display device coupled to the processor for displaying processed speech.

17. The system of claim 16 further comprising an air traffic control audio input coupled to the processor.

18. The system of claim 13 wherein the FIR database contains the geographic boundaries of each FIR region.

* * * * *